Figure 1:
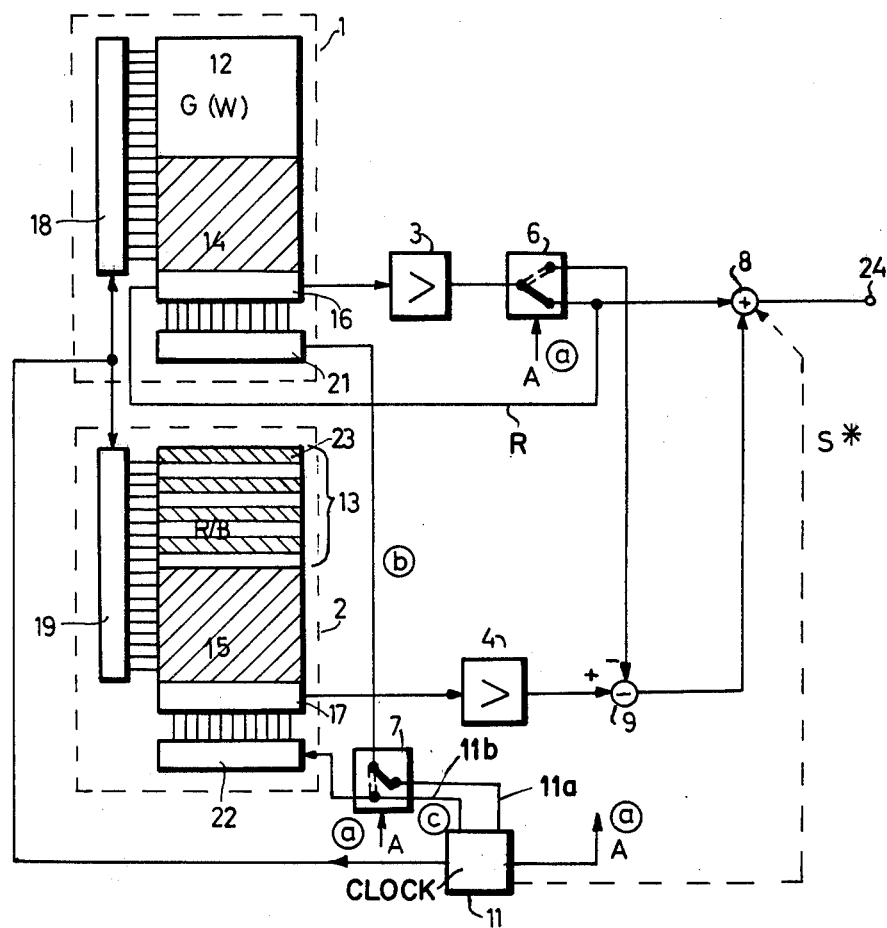

United States Patent [19]

Bock et al.

[11] 4,246,598
[45] Jan. 20, 1981

[54] COLOR TELEVISION CAMERA SYSTEM HAVING SOLID-STATE OPTO-ELECTRIC TRANSDUCERS FOR LUMINANCE AND CHROMINANCE SIGNALS

[75] Inventors: Gerd Bock, Seeheim; Gerd Brand, Wendeburg, both of Fed. Rep. of Germany

[73] Assignee: Robert Bosch GmbH, Stuttgart, Fed. Rep. of Germany

[21] Appl. No.: 95,145

[22] Filed: Nov. 16, 1979

[30] Foreign Application Priority Data

Nov. 20, 1978 [DE] Fed. Rep. of Germany ....... 2850309

[51] Int. Cl.³ ............................................. H04N 9/04
[52] U.S. Cl. ...................................... 358/12; 358/43; 358/41
[58] Field of Search ................. 358/9, 12, 41, 43, 141, 358/142, 145

[56] References Cited

U.S. PATENT DOCUMENTS

| | | | |
|---|---|---|---|
| 3,726,991 | 4/1973 | Takeumura | 358/43 |
| 3,781,463 | 12/1973 | Van den Bossche | 358/12 |
| 4,163,247 | 7/1979 | Bock | 358/12 |

*Primary Examiner*—Robert L. Griffin
*Assistant Examiner*—Michael A. Masinick

*Attorney, Agent, or Firm*—Frishauf, Holtz, Goodman & Woodward

[57] ABSTRACT

To simplify television cameras, particularly of the type previously disclosed in U.S. Pat. No. 4,163,247, Bock et al, the green (or white) content of an image and the red/blue content of an image are transduced by two-dimensional semiconductor sensors which include read-out and storage sections, the read-out being controlled by shift registers which, in turn, operate under control of a clock generator. The luminance of the signal is derived by reading out the luminance portion during the line scanning interval and the thus read out signal is immediately re-stored in the storage portion of the luminance transducer; the chrominance signal is read out from the chrominance sensor during the line blanking interval; during this interval, the re-stored luminance portion is likewise read out and combined with the chrominance portion to form a difference signal. The overall output then will be a time multiplexed luminance signal, at the line scanning rate, and a compressed chrominance signal, read out during the line blanking interval. Additional synchronization signals may be combined with this signal if the read-out rate during the line blanking interval is suitably selected to allocate time slots therefor.

8 Claims, 2 Drawing Figures

COLOR TELEVISION CAMERA SYSTEM HAVING SOLID-STATE OPTO-ELECTRIC TRANSDUCERS FOR LUMINANCE AND CHROMINANCE SIGNALS

The present invention relates to a color television camera system, and more particularly to a camera system of the type described in U.S. Pat. No. 4,163,247, Bock, Brand, and Ilmer, assigned to the assignee of the present application, in which luminance and chrominance information is derived and formed into a time multiplexed signal.

BACKGROUND AND PRIOR ART

The U.S. Pat. No. 4,163,247, the disclosure of which is hereby incorporated by reference, teaches an arrangement in which luminance signals are derived from a luminance pick-up tube, chrominance signals are derived from a chrominance pick-up tube, and the signals ae time multiplexed for transmission or recording. The resulting signal can then be converted into a standard composite color video signal by a suitable transcoder. The system permits, due to the time multiplex arrangement, simplification in the camera apparatus.

THE INVENTION

It is an object to additionally simplify the system described in the aforementioned U.S. Pat. No. 4,163,247, and specifically to permit use of the system with cameras which use semiconductor sensors, thus permitting even lighter and cheaper apparatus.

Briefly, the transducer of the camera comprises two-dimensional semiconductor sensors, in which each one of the sensors has a transducer portion, a storage portion and a read-out portion; the read-out portion is controlled to read out signals transferred by the storage portion under control of a clock, at the normal line scanning rate; simultaneously, these signals are re-recorded in the transducer, however, so that they can subsequently be read out at a higher rate, under control of a clock operating at a substantially increased rate during the line blanking interval, at which time, also, the chrominance information is read out from a similar chrominance sensor, the re-recorded luminance signal being subtracted from the chrominance signal and, by means of an adding function circuit, conducted to the output of the camera, so that the output of the camera will be a composite color video signal suitable for recording, transmission and, if needed, sequential processing by a transcoder to convert it into a standard NTSC or PAL signal.

In accordance with a feature of the invention, switch-over means are provided controlled by the clock system to effect the sequential read-out of, respectively, the luminance and the chrominance sensor and the re-recording of the luminance signal.

The system has the advantage that a television camera apparatus can be constructed which is simpler and easier to handle, and cheaper than previously available camera apparatus. Additionally, since a color difference signal is transmitted, interferences or disturbances are less troublesome, so that transmission quality is improved. Non-linearities in the transmission chain, such as non-linearities in amplifiers, magnetic recording apparatus, cable connections, and the like, will not introduce color or white-level balance errors.

In accordance with a desirable feature of the invention, an opto-electronic semiconductor sensor is provided for brightness information, that is, to provide the luminance portion of the video signal, and another opto-electronic semiconductor sensor for the color information, that is, to provide the chrominance portion. In advance of the chrominance semiconductor sensor, a red/blue strip filter is located, having horizontal strips. Since the geometric position of the lines in an opto-electronic sensor can be accurately determined, counting of the lines enables unambiguous association of red or blue chrominance information, respectively, with respective scanning cycles.

Figure 2:
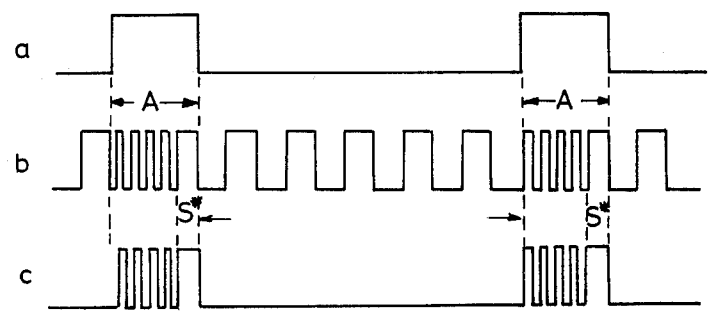

Drawings, illustrating a preferred embodiment:

FIG. 1 is a highly schematic block circuit diagram of those portions of a color video camera necessary for an understanding of the present invention; and FIG. 2 shows, in three graphs, a, b, c, pulse diagrams of signals arising in the system of FIG. 1.

The color video camera—see FIG. 1—has the usual optics (not shown) and color separation system, likewise not shown, to provide for incidence of white or green light, respectively, to an opto-electronic semiconductor sensor 1, to transduce brightness or luminance information, and to apply red and blue colors, respectively, to a second electronic semiconductor sensor 2, to transduce red and blue light to provide chrominance information. Each one of the semiconductor sensors 1, 2 is two-dimensional and connected to respective amplifiers 3, 4. The output of the amplifier 3 is conducted to a transfer switch 6, which has one switch output connected to an adder stage 8, and a return line R back to the sensor 1. The output of amplifier 4 is connected to a subtracting stage 9 which has its output connected to the adder stage 8. The system additionally includes a clock 11 which has two outputs 11a, 11b providing output signals at respectively different clock rates. The sensors 1, 2 are charge coupled devices of the frame transfer type; they may, also, be interline transfer charge coupled devices.

The opto-electronic sensors 1, 2, respectively, each consist of a sensor portion 12, 13, itself, a separate, covered storage portion 14, 15, and a read-out portion 16, 17. Each one of them has a respective shift register 18, 19 connected thereto for vertical scanning, and another shift register 21, 22 for horizontal scanning.

A red/blue strip filter 23 is located in the path of light to the sensor portion 13 of the opto-electronic semiconductor sensor 2 for chrominance information. The strip filter 23 has horizontally extending strips which, respectively, permit passage therethrough of the red and blue content, respectively, of the image; the strips are associated respectively to one line each of the opto-electronic semiconductor sensor portion. A second transfer switch 7 is provided, respectively switching the outputs 11a or 11b from the clock 11 to the shift register 21 associated with the sensor 1. The clock, additionally, provides a signal a at a separate output controlling the respective switches 6, 7.

Operation, with reference to FIG. 2: The optical system, including the color separation optics images the light from the scene to be transduced on the sensors 1, 2. The color separation splits the color components green—or white, respectively—into G (W) image portions and the red/blue (R/B) portion. The sensor portion 12 of the opto-electronic semiconductor sensor 1 thus will have the green (or white, respectively) color content of the scene imaged thereon. The sensor portion 13 of the opto-electronic sensor 2 will have the red-blue color content imaged thereon, by means of the horizontal strips on the strip filter 23 which alternate, line by line, transmit red or blue light, respectively, so that for any two adjacent lines of the full image only the red or blue color information, respectively, is actually transduced by the transducer portion 13.

Both opto-electronic semiconductor sensors 1 and 2 are controlled by vertical clock signals, derived from clock 11, and scanned by means of shift registers 18, 19 which, in turn, are connected to the clock 11. The shift registers cause read-out of the information from the sensor portion 12, 13 of the image transduced therein into the covered storage portion 14, 15, and from there are shifted into the read-out portions 16, 17 line by line.

The read-out portion 16 of the opto-electronic sensor is scanned during the normal line scanning time by the shift register 21, which receives scanning pulses from output 11a through transfer switch 7 which is in the position shown in full lines—see graph a of FIG. 2. The so read-out image signal which contains the brightness or luminance information is amplified in the amplifier 3 and transferred over the transfer switch 6, which will be in the position shown in full lines in FIG. 1, to one input of an adder stage 8 for transmission to an output 24. The second input to the adder stage 8 at this time will not add any signals thereto. A portion of the signal from transfer switch 6 is, additionally, returned to the input of the read-out portion 16 of sensor 1 through return line R.

During the normal line scanning or line tracing interval, the picture signal containing the luminance information is thus handled in dual manner: (a) it is transmitted through the adder 8 and hence to output 24, and (b) is fed back through the return line R for read-in again into read-out portion 16 which, thus, will operate in a ring shifting mode.

During the horizontal retrace or blanking interval, the signal which has again been read into the portion 16 of sensor 1 is scanned once more and read out once more, but at a rate which is substantially higher than the first read-out rate—for example about 4 to 5 times the rate. To change over, the switches 6, 7 are controlled by a signal a (see FIG. 2) from the clock 11 to change into the broken-line position. This places the scanning clock frequency from clock 11 to output 11b. Simultaneously, the output from portion 16, after amplification, is now applied through transfer switch 6 to the subtracting input of the subtracting circuit 9. At the same time, and since the output 11b from the clock 11 is now energized, the shift register 22 will control the read-out portion 17 of sensor 2 to read out the information therein in synchronism with read-out of the information, at the accelerated rate, in the read-out portion 16 of sensor 1, for simultaneous application to the subtracting stage 9—see graph c of FIG. 2.

The output of the subtracting stage 9 thus will contain, in alternate lines, the color difference signal R−Y and B−Y. These signals are applied to the second input of the adder stage 8 so that, at the output 24, a time multiplexed coded video signal will be derived which, during the customary line trace interval of any one line, contains the luminance information and, during the retrace interval, the chrominance information, alternating between R−Y and B−Y.

Depending on use and subsequent processing, scanning and synchronization signals may also be provided, in a form which may differ from that of standard television signals determined by the respective transmission standards. Thus, a synchronizing signal S*, generated by the clock source 11 can additionally be introduced in the adder stage 8. The additional line, since a possibly used addition, is shown in broken lines.

The output signal derived from terminal 24, which can be termed a BASC signal, and which is a composite color video signal which is not, however, in standard transmission or reproduction form, can be recorded with a relatively simple magnetic recording apparatus, for example a recording apparatus essentially designed to record black/white (B/W) TV signals. To further reproduce this BASC signal, and for further transmission or recording or reproduction in color television equipment, the BASC signal must be transformed into the standard composite color video signal by use of a transcoder (not shown) as well known, and of any suitable construction.

Various changes and modifications may be made within the scope of the inventive concept.

It is not necessary that the signal being fed back by the feedback or re-storage line R be stored in the sensor 1 itself; a temporary, for example volatile, storage or memory section and connected to be read out at the rate determined by terminal 11b of clock 11—switch 7 in the broken-line position, for example by connection to any one of the shift registers 21, 22, could also be used, with suitable additional switching. The system as shown, however, makes such additional storage or memory equipment unnecessary and thus provides for maximum simplicity in the overall camera system.

We claim:

1. Color television camera system having a luminance opto-electronic transducer (1) and a chrominance opto-electronic transducer (2) and means to obtain combined color video signals from said transducers by scanning the chrominance component output signal during the line blanking interval of the luminance component signal, wherein, in accordance with the invention, each transducer comprises
a two-dimensional semiconductor sensor (1, 2), each sensor including
a transducer portion (12, 13);
a storage portion (14, 15);
and a read-out portion (16, 17);
timing means (11) including first clock means (11a) controlling read-out, at a line scanning rate, of the read-out portion (16) of the luminance sensor to provide a luminance signal;
means (R, 16) reentering the information read out into the luminance semiconductor sensor for restorage therein of the luminance component of the video signal;
said timing means further including second clock means (11b) controlling read-out of the read-out portion (17) of the chrominance sensor (2) to provide a chrominance signal, said second clock means being operative during the blanking interval and controlling said read-out at a rate high with respect to the line scanning rate, said second clock means additionally controlling read-out of the reentered luminance component of the video signal in the luminance sensor during the blanking interval to form a compressed luminance signal; and
subtraction function circuit means (9) subtracting the compressed luminance signal component read out from said read-out portion of the chrominance sensor to obtain a combined time multiplexed signal having, sequentially, the luminance component during the line scanning interval and, during the blanking interval, a chrominance difference signal component.

2. System according to claim 1, further comprising a red/blue strip filter (23) located optically in advance of the chrominance sensor (2) and including alternating strips passing, respectively, red and blue color components of the image being transduced.

3. System according to claim 1, further comprising an output circuit (8, 24) including an adder function stage (8), said adder function stage being connected to the output from said read-out portion of the luminance sensor and the subtraction function circuit means (9), said adder function circuit supplying the luminance component signal during scanning of the luminance sensor (1) and the chrominance difference signal during the line blanking interval and upon scanning of both the luminance and the chrominance sensors.

4. System according to claim 3, further comprising switch-over means (6) selectively connecting the output being read out from said luminance sensor
   (a) to the adder function stage and back to the sensor for reentry, or
   (b) to the subtraction function stage (9),
   the timing means controlling switch-over of said switch-over means to effect the respective connection (a) during line scanning and the connection (b) during line blanking.

5. System according to claim 3, wherein the timing means generates additional synchronization signals (S*);
   and means are provided connecting said synchronization signal to the adder function stage.

6. In a color television camera system having a luminance opto-electronic transducer (1) and a chrominance opto-electronic transducer (2),
   a method of scanning said transducers and deriving a composite video image signal suitable for recording, comprising
   deriving luminance signal components and storing said signal components;
   reading out said luminance signal components at a line scanning rate;
   storing said read-out luminance signals;
   transducing and storing chrominance signals;
   reading out the chrominance signals at a rate high with respect to the line scanning rate subsequent to read-out of the luminance signal while simultaneously reading out the re-stored luminance signals;
   combining said chrominance signals and said re-read, re-stored luminance signals, simultaneously, in a combining circuit (9) to provide a difference signal;
   and connecting, sequentially, said initially read-out luminance signals and said combined difference signals to an output circuit (24).

7. Method according to claim 6, wherein the step of transducing the luminance signal comprises transducing the luminance signal in a storage-type transducer;
   and the step of storing the luminance signal comprising reentering the luminance signal into the storage-type transducer for subsequent read-out, at said accelerated rate, concurrently with read-out of the chrominance signal from the chrominance transducer.

8. Method according to claim 6, wherein the step of obtaining the combined difference signal is controlled to occur during the line blanking interval of the television signal to be obtained.

* * * * *